United States Patent
Rainer et al.

(10) Patent No.: US 10,403,428 B2
(45) Date of Patent: Sep. 3, 2019

(54) WINDING MODULE, HYBRID TRANSFORMER, MODULE AND CIRCUIT FOR DC-DC POWER CONVERSION

(71) Applicant: Infineon Technologies Austria AG, Villach (AT)

(72) Inventors: Christian Rainer, Klagenfurt (AT); Matteo-Alessandro Kutschak, Ludmannsdorf (AT); Otto Wiedenbauer, Villach (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/024,520

(22) Filed: Jun. 29, 2018

(65) Prior Publication Data

US 2019/0013140 A1    Jan. 10, 2019

(30) Foreign Application Priority Data

Jul. 4, 2017 (EP) ...................... 17179660

(51) Int. Cl.
*H01F 27/28* (2006.01)
*H01F 30/02* (2006.01)
*H01F 30/04* (2006.01)
*H01F 27/24* (2006.01)
*H02M 1/08* (2006.01)
*H02M 3/155* (2006.01)
(Continued)

(52) U.S. Cl.
CPC .............. *H01F 27/28* (2013.01); *H01F 27/24* (2013.01); *H01F 27/2804* (2013.01); *H01F 30/02* (2013.01); *H01F 30/04* (2013.01); *H02M 1/08* (2013.01); *H02M 3/155* (2013.01); *H01F 2027/2809* (2013.01); *H01F 2038/026* (2013.01); *H02M 2001/0048* (2013.01)

(58) Field of Classification Search
CPC ............ H01F 27/24; H01F 27/28; H01F 5/00; H02M 3/155–158; H02M 1/08; H02M 7/537; H02M 2001/0054; Y02B 70/1425
USPC ........ 336/170, 180, 200; 323/224, 255, 259, 323/282; 363/131, 132; 333/119
See application file for complete search history.

(56) References Cited

U.S. PATENT DOCUMENTS 3,539,959 A    11/1970  Wildi
5,726,615 A *   3/1998  Bloom .................. H01F 27/255
                                                  336/178

(Continued)

FOREIGN PATENT DOCUMENTS

DE    19543249 A1    8/1996
EP    2666881 A1    11/2013

*Primary Examiner* — Yemane Mehari
(74) *Attorney, Agent, or Firm* — Murphy, Bilak & Homiller, PLLC

(57) ABSTRACT

In an embodiment, a DC-DC power conversion circuit with a step-down conversion ratio of at least 12:1 is provided. The DC-DC power conversion circuit includes a half-bridge circuit arrangement, a resonant capacitor and a module including a hybrid transformer. The hybrid transformer includes a magnetic core and a primary winding electrically coupled in series with a secondary winding. The module further includes a synchronous rectifier having an output coupled between the primary winding and the secondary winding of the hybrid transformer, and an output capacitor coupled with an output of the secondary winding.

11 Claims, 10 Drawing Sheets

(51) Int. Cl.
*H01F 38/02* (2006.01)
*H02M 1/00* (2006.01)

(56) References Cited

U.S. PATENT DOCUMENTS

| | | | |
|---|---|---|---|
| 6,486,642 B1* | 11/2002 | Qian | H02M 3/158 |
| | | | 323/255 |
| 6,760,202 B1* | 7/2004 | Meyer | H01F 5/003 |
| | | | 361/115 |
| 2003/0142513 A1 | 7/2003 | Vinciarelli | |
| 2008/0231403 A1* | 9/2008 | Hsu | H01F 27/2804 |
| | | | 336/180 |
| 2012/0249102 A1* | 10/2012 | Cuk | H02M 3/158 |
| | | | 323/282 |
| 2014/0320205 A1 | 10/2014 | Lyalin et al. | |
| 2016/0012954 A1* | 1/2016 | Noda | H01F 27/255 |
| | | | 320/162 |

* cited by examiner

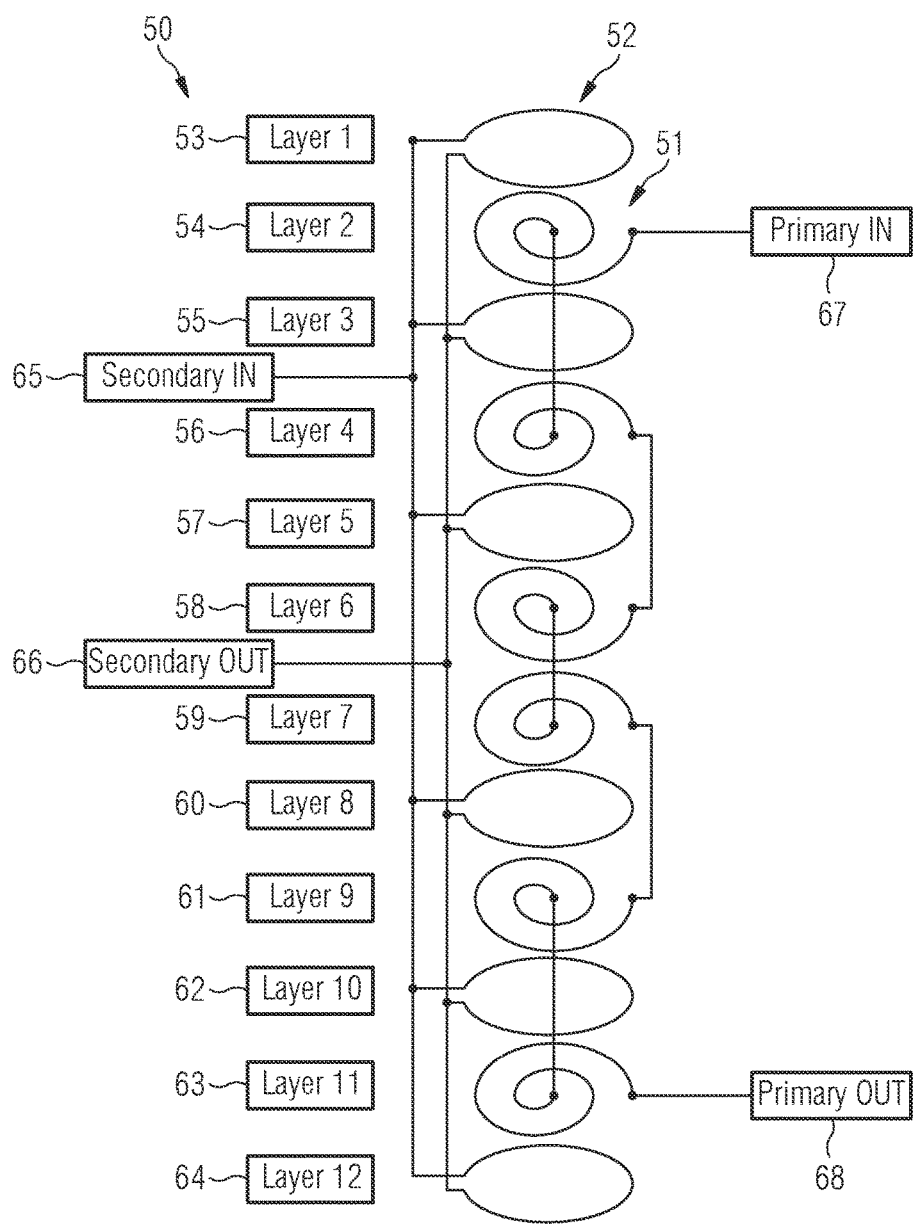

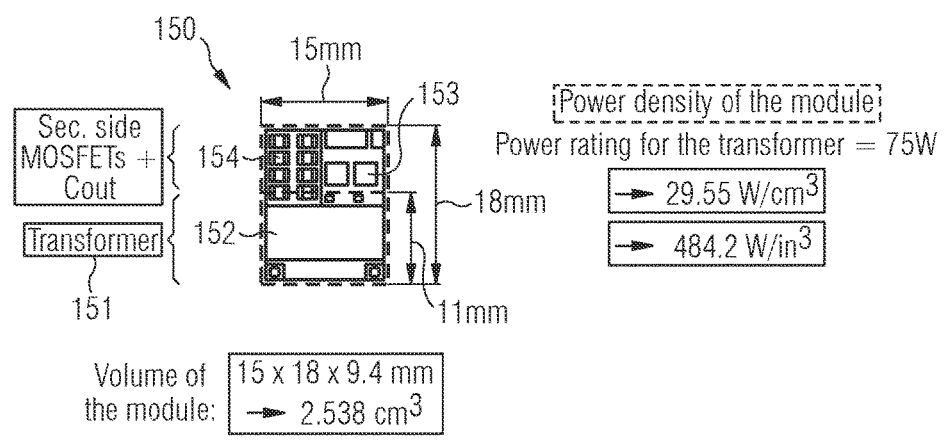
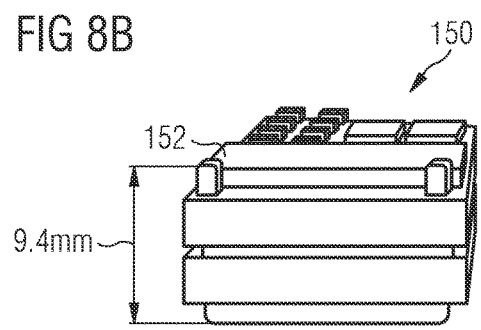

FIG 10
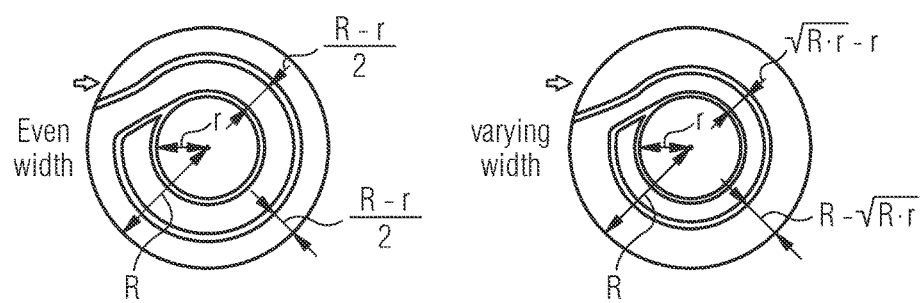
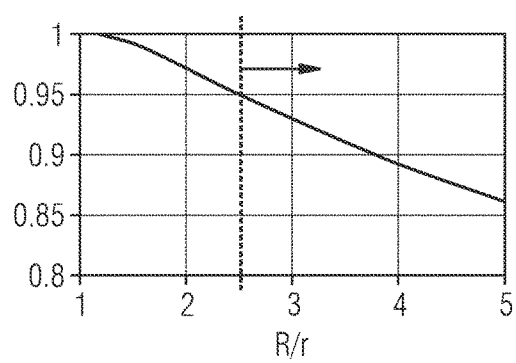
Winding resistance ratio:
$$\frac{R_{total} \text{ with varying width}}{R_{total} \text{ with even width}}$$

US 10,403,428 B2

WINDING MODULE, HYBRID TRANSFORMER, MODULE AND CIRCUIT FOR DC-DC POWER CONVERSION

BACKGROUND

Power conversion, such as AC-DC or DC-DC power conversion, is required in many applications. An AC power supply at 230 V may be first converted to a DC power supply at a lower voltage for example 48 V. Some applications require an even lower DC voltage, for example 12 V or around 2 volts, for example 1.8 V. This may be provided by using a multistage DC-DC conversion system, in which, for example, a 48V DC supply is converted into a 12 V DC supply which in turn is converted to a 1.8 V output voltage supply. As each conversion step typically has an efficiency which is less than 100%, the efficiency of the entire conversion process may be further reduced as the number of conversion stages increases. Additionally, each conversion stage is associated with components to provide the power conversion circuit which, in some applications, may lead to an undesirable occupation of space.

In some applications, such as power conversion for use in data centres, in which an output voltage of around 1.8 V DC is required, a circuit providing a higher DC-DC step-down conversion ratio would be desirable, for example to convert a 48 V DC input voltage into a 1.8 V DC output voltage. Additionally, it is desirable to provide such a conversion circuit and modules for providing the circuit which have a lower volume and a higher power rating per unit volume, which is also referred to as power density.

SUMMARY

In an embodiment, a winding module for a hybrid transformer is provided that comprises a primary winding electrically coupled in series with a secondary winding. The primary winding comprises a first conductive trace arranged on a planar support and the secondary winding comprises a second conductive trace arranged on the planar support. The first conductive trace and the second conductive trace are arranged in a stack. The planar support comprises an aperture for accepting a magnetic core.

In an embodiment, a hybrid transformer is provided that comprises a winding module and a magnetic core. The winding module for a hybrid transformer comprises a primary winding electrically coupled in series with a secondary winding. The primary winding comprises a first conductive trace arranged on a planar support and the secondary winding comprises a second conductive trace arranged on the planar support. The first conductive trace and the second conductive trace are arranged in a stack. The planar support comprises an aperture for accepting a magnetic core. The magnetic core comprises a central protruding portion that protrudes into the aperture in the planar support and two outer arms that extend adjacent two opposing side faces of the planar support.

In an embodiment, a module for use in a DC-DC power conversion circuit is provided. The module comprises a hybrid transformer comprising a magnetic core and a primary winding electrically coupled in series with a secondary winding. The module further comprises a synchronous rectifier having an output coupled between the primary winding and the secondary winding, and an output capacitor coupled with an output of the secondary winding.

In an embodiment, a DC-DC power conversion circuit with a step-down conversion ratio of at least 12:1 is provided. The DC-DC power conversion circuit comprises a half-bridge circuit arrangement, a resonant capacitor and a module comprising a hybrid transformer, the hybrid transformer comprising a magnetic core and a primary winding electrically coupled in series with a secondary winding. The module further comprises a synchronous rectifier having an output coupled between the primary winding and the secondary winding of the hybrid transformer and an output capacitor coupled with an output of the secondary winding.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Exemplary embodiments are depicted in the drawings and are detailed in the description which follows.

FIG. 1b illustrates a block diagram of a module for providing a portion of the circuit of FIG. 1a.

FIG. 2 illustrates a schematic diagram of a winding layout for a hybrid transformer.

FIG. 8a illustrates a top view of an exemplary power conversion module including a hybrid transformer, a secondary side switch and output capacitor.

FIG. 8b illustrates a side view of an exemplary power conversion module including a hybrid transformer, a secondary side switch and output capacitor.

FIG. 10 illustrates an example of a primary winding with including a conductive trace of varying width.

DETAILED DESCRIPTION

Figure 1A:
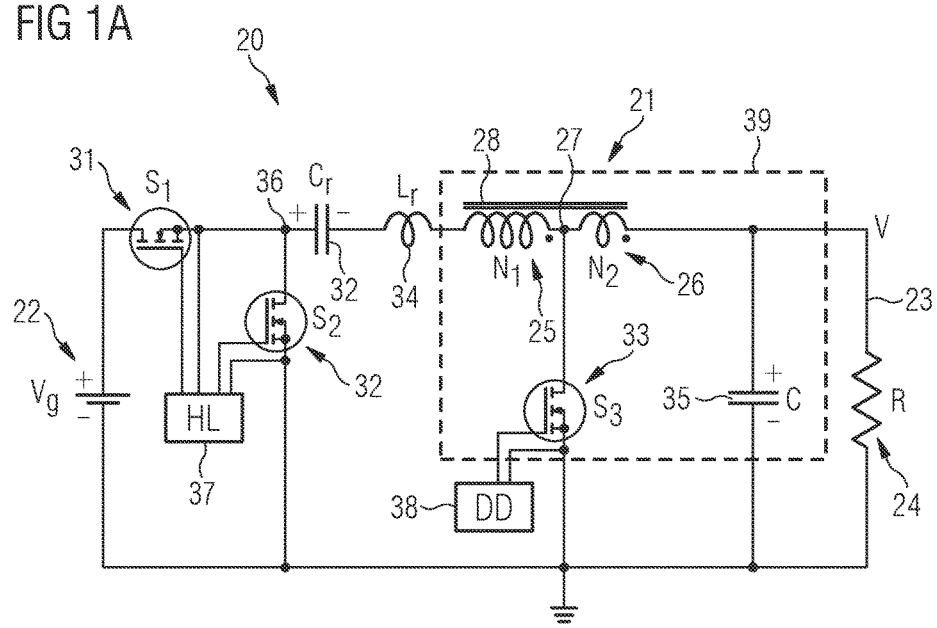
FIG. 1a illustrates a circuit for DC-DC power conversion that includes a hybrid transformer.

In the following detailed description, reference is made to the accompanying drawings, which form a part hereof, and in which is shown by way of illustration specific embodiments in which the invention may be practiced. In this regard, directional terminology, such as "top", "bottom", "front", "back", "leading", "trailing", etc., is used with reference to the orientation of the figure(s) being described. Because components of the embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, thereof, is not to be taken in a limiting sense, and the scope of the present invention is defined by the appended claims.

A number of exemplary embodiments will be explained below. In this case, identical structural features are identified by identical or similar reference symbols in the figures. In the context of the present description, "lateral" or "lateral direction" should be understood to mean a direction or extent that runs generally parallel to the lateral extent of a semiconductor material or planar body or planar carrier. The lateral direction thus extends generally parallel to these surfaces or sides. In contrast thereto, the term "vertical" or "vertical direction" is understood to mean a direction that runs generally perpendicular to these surfaces or sides and thus to the lateral direction. The vertical direction therefore runs in the thickness direction of the semiconductor material or planar carrier or planar body.

As employed in this specification, when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present.

As employed in this specification, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The winding module, hybrid transformer, module and DC-DC-conversion circuit according to one of the embodiments described herein may be used in applications in which a DC-DC conversion power conversion circuit having a step down ratio of at least 12 to 1 or at least 24 to 1 is desired. One application area in which the winding module, hybrid transformer, module and DC-DC-conversion circuit according to one of the embodiments described herein may be used, is power supply in data centres.

Typically, the servers in a data centre, in particular the motherboards of the servers in a datacentre, may be supplied with a 12 V DC power supply which is converted to a lower voltage as required by the processors mounted on the motherboards of the servers. However, it may be desirable to provide a 48V DC power supply at the servers, which is then converted in a single conversion step to a lower voltage, for example 2 V, 1.8 V or 1 V corresponding to the power supply required by the processors to simplify cooling of the data centre and improve electrical conversion losses. For these applications, embodiments described herein may be used to provide a compact module which can be placed as close as possible to the processor, i.e. mounted on the motherboard, which may assist in increasing conversion efficiency.

FIG. 1a illustrates a circuit 20 for DC-DC power conversion which has a step down conversion ratio of at least 12 to 1. The circuit 20 includes a hybrid transformer 21 which is used in a dual mode by transferring inductive and capacitive energy storage.

The circuit 20 includes an input terminal 22 for receiving an input voltage, for example a 48 V DC power supply, an output terminal 23 which is dropped across a load 24. The load 24 is illustrated in the circuit 20 is a simple resistor. However, the load 24 may be any application requiring a power supply at the output voltage supplied by the circuit 20. For example, the load may be an IC chip such as a processor.

The hybrid transformer 21 includes a primary winding 25 and a secondary winding 26 that is electrically coupled in series with the primary winding 25 at node 27, in particular the primary winding 25 and the secondary winding may be electrically connected and electrically resistively connected at the node 27. The primary winding 25 has a number of turns N1 and secondary winding 26 includes a number of turns N2. The primary winding 25 the secondary winding 26 are also coupled by a common magnetic core 28.

The circuit includes a first switch S1, a second switch S2, a third switch S3, a resonant capacitor 32, a resonant inductor 34 and an output capacitor 35. The first switch S1, second switch S2, resonant capacitor 32 and resonant inductor 34 are coupled to the input side of the hybrid transformer 21. In particular, the first switch S1 is coupled between the high voltage input terminal 22 and the resonant capacitor 32. The resonant capacitor 32 and resonant inductor 34 are coupled in series between the output of the first switch S1 and the input of the hybrid transformer 21, in particular, the input to the primary winding 25. An output of the primary winding 25 is electrically coupled to the node 27 and input of the secondary winding 26. The second switch S2 is coupled between a node 36 arranged between the output of the first switch S1 and the input capacitor 32 and ground.

The first switch S1 and the second switch S2 may be coupled to driver circuitry 37. The third switch S3 is coupled between the node 27 between the primary winding 25 and the secondary winding 26 and ground. The third switch S3 may be coupled to a further driver circuit 38. The third switch S3 may be a synchronous rectifier. The output capacitor 35 is coupled between the output of the hybrid transformer 21, in particular the output of the secondary winding 26 and ground.

The switches S1, S2 and S3 may be provided by transistor devices such as MOSFET devices 31, 32 and 33. The first MOSFET device 31 and the second MOSFET device 32 may form a half-bridge circuit. The Source of the second MOSFET device 32 is coupled to ground and the Drain of the second MOSFET device is coupled to the Source of the first MOSFET device 31 at the node 36. The Drain of the first MOSFET device 31 is coupled to the high voltage input 22. The Gate of the first MOSFET device 31 and the Gate of the second MOSFET device 32 are driven by the driver circuitry 37. The first MOSFET device 31 forms the high-side switch and the second MOSFET device 32 forms the low-side switch of the half-bridge circuit.

The Source of the third MOSFET device 33 is coupled to Ground and the Drain of the third MOSFET device 33 is coupled to the node 27 and, therefore, to the primary winding 25 and secondary winding 26 of the hybrid transformer.

The Ground provides a common terminal. In some embodiments, the common terminal may be at a voltage other than ground voltage.

In order to provide a DC-DC step-down conversion ratio of at least 12 to 1, the circuit 20 may be configured to operate as follows. The driver circuitry 37 is configured to keep the first switch S1 ON and the second switch S2 and the synchronous rectifier switch S3 OFF during a TON time interval, and to keep the first switch S1 OFF and the second switch S2 and the synchronous rectifier switch S3 ON during a TOFF time interval. The TON time interval and the TOFF time interval are complementary time intervals within one switch operating cycle TS of the circuit 20.

The resonant inductor 34 and the resonant capacitor 32 form a resonant circuit during the TOFF time interval with a resonant current flowing through the primary winding 25 into the load 24. A first turns ratio n of the hybrid transformer 21 is a total number of turns N1 of the primary winding 25 and the number of turns N2 of the secondary winding N2 divided by a number of turns of the second winding N2 of the hybrid transformer, i.e. n=(N1+N2)/N2. An input current during the TON time interval stores an inductive energy in the primary winding 25 and the secondary winding 26. During the TOFF time interval, the stored inductive energy is transferred to the load 24 through the second winding 26 by n times higher current than the input current.

A second turns ratio m of the hybrid transformer 21 is the ratio between number of turns N1 of the primary winding 25 and the number of turns N2 of the secondary winding 26 of the hybrid transformer, i.e. m=N1/N2. The resonant current in the primary winding 25 is amplified by the second turns ratio m of the hybrid transformer 21 and sent to the load 24 through the secondary winding 26 of the hybrid transformer 21. A duty ratio D is the ratio between the TON time interval and the switching operating cycle TS. A DC-to-DC voltage step-down conversion ratio of the converter depends on the duty ratio D and the first turns ratio n of the hybrid transformer.

The circuit 20 includes two distinct switching networks, one for the TON time interval and another for the TOFF time interval.

During the TON time interval, three charges take place. The source current from input 22 charges the resonant capacitor Cr and stores capacitive energy on it, stores inductive energy in the magnetizing inductance of the hybrid transformer 21 and delivers the capacitive charging current to the load 24. During the ON-time interval both the primary winding 25 and the resonant capacitor Cr store the energy from input source 22 and simultaneously provide the same source current to the load 24.

During the TOFF time interval, two discharges take place: inductive discharge of the stored inductive energy in the previous TON time interval and capacitive discharge of the energy stored during the TON time interval on the resonant capacitor Cr. The energy stored in the previous TON time interval is released to the load 24 during the TOFF time interval through two different charge transfer paths.

During the TOFF time interval, hybrid transformer 21 releases its previously stored energy through its secondary winding 26 with N2 turns to the load 24. The second switch S2 provides a part of the load current due to the direct connection to the load terminal. For example for n=2 and D=0.5, 20% of the load current is provided by the current path from the second switch S2 and the other 80% of the load current is provided through the transfer via hybrid transformer 21 with 40% of the load contributed by the inductive energy transfer and the other 40% of the load current contributed by the capacitive energy transfer through the current multiplication of the hybrid transformer 21 from its primary winding 25 to its secondary winding 26 according to the second turns ratio m.

Therefore, the load 24 is supplied with the current during both parts of the switching interval, i.e. during the TON-time interval and TOFF-time interval.

A step-down ratio of at least 12:1 or at least 24:1 can be achieved with the DC-DC power conversion circuit 20 illustrated in FIG. 1a at high efficiency by appropriate selection of the duty ratio D and the first turns ratio n of the hybrid transformer.

The circuit 20 illustrated in FIG. 1a may be provided by providing each of the illustrated components, such as the switches S1, S2, S3, resonant capacitor 32, resonant inductor 34, hybrid transformer 21, output capacitor 35 as a discrete device. However, in order to provide a compact circuit, two or more of the components may be provided by a single module.

In some embodiments, a module 40 is provided which includes the hybrid transformer 21 including the magnetic core 28, the primary winding 25 and secondary winding 26, whereby the primary winding 25 is electrically coupled in series with the secondary winding 26, the synchronous rectifier S3 having an output coupled between the primary winding 25 and the secondary winding 25 of the hybrid transformer 21 and the output capacitor 35, which is coupled with the output of the secondary winding 26. The portion of the circuit 20 provided by such a module 40 is indicated in FIG. 1a by the dashed line 39.

Figure 1B:
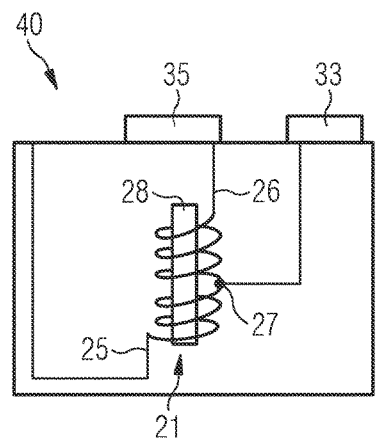

FIG. 1b illustrates a schematic block diagram of the module 40 including the hybrid transformer 21, output capacitor 35 and synchronous rectifier in the form of a MOSFET 31. The hybrid transformer 21 includes the magnetic core 28, the primary winding 25 and the secondary winding 26 that are electrically coupled in series at the node 27 and magnetically coupled to the magnetic core 28. The MOSFET 31, in particular, the Drain of the MOSFET 31 is coupled to the node 27 between the primary winding 25 and the secondary winding 26.

In some embodiments, the primary winding 25 and the secondary winding 26 of the hybrid transformer 21 may be fabricated using a stacked arrangement of the turns providing the primary winding 25 and the secondary winding 26. In particular, the turns may be provided by planar conductive traces, which are arranged on a planar support in a vertical stack. For example, multiple layers in the vertical stack may each include a conductive trace. The conductive traces may have the form of a planar spiral having a number of turns, for example 2 turns. The planar support may include electrically insulative material.

The planar conductive traces may be electrically coupled to form a winding with the desired total number of turns, for example N1 turns for the primary winding 25 and N2 turns for the secondary winding 26. Electrically insulative material may be positioned between adjacent conductive traces in the stack. The conductive traces may be electrically coupled by one or more conductive vias which extend perpendicularly to the conductive traces through the intervening electrically insulative material.

The number of turns N1 of the primary winding 25 and the number of turns N2 of the secondary winding 26 may be selected to provide the desired step down conversion ratio. For example, if N1 is 12 and N2 is 1, a step down conversion ratio of 12 to 1 is provided.

FIG. 2 illustrates a schematic diagram of a winding layout 50 for providing a primary winding 51 and a secondary winding 52 for hybrid transformer. In particular, the winding layout 50 is suitable for use in an arrangement in which the primary and secondary windings 51, 52 are formed from a stack of planar turns. For example, multiple layers of the stack may include a conductive trace supported on or sandwiched between electrically insulating layers. The conductive traces may be electrically coupled by conductive vias extending through the electrically insulating layers. The conductive trace may include a planar spiral including one or more turns.

In the arrangement illustrated in FIG. 2, the primary winding 51 includes six layers and the secondary winding 52 includes six layers giving the winding arrangement 50 a total of 12 conductive layers which are arranged in a stack.

Starting from the uppermost first layer 53 of the winding arrangement and moving downwards through the stack, the first layer 53 provides a portion of the secondary winding 52, the second layer 54 provides a portion of the primary winding 51, the third layer 55 provides a portion of the secondary winding 52, the fourth layer 56 provides a portion of the primary winding 51, the fifth layer 57 provides a portion of the secondary winding 52, the sixth layer 58 and the seventh layer 59 each provide a portion of the primary winding 51, the eighth layer 60 provides a portion of the secondary winding 52, the ninth layer 61 provides a portion of the primary winding 51, the tenth layer 62 provides a portion of the secondary winding 52, the eleventh layer 63 provides a portion of the primary winding 51 and the twelfth and lowermost layer 64 provides a portion of the secondary winding 52.

The arrangement 50 includes two portions of the primary winding 51 arranged directly adjacent one another at the centre of the stack on the sixth layer 58 and seventh layer 59. In the remainder of the structure, the portions of the secondary winding 52 and primary winding 51 are interleaved such that the uppermost and lowermost layers 53, 64 include portions of the secondary winding 52.

The conductive traces of the layers 53, 55, 57, 60, 62 and 64 which provide portions of the secondary winding 52 are electrically coupled in parallel and, therefore, provide a secondary winding 52 having a single turn. In the winding arrangement 50, the input 65 to the secondary winding may be arranged between the third layer 55 and fourth layer 56 and the output 66 of the secondary winding 52 may be arranged between the sixth layer 58 and the seventh layer 59.

The portions of the primary winding 51 arranged on the layers 54, 56, 58, 59, 61 and 63 each include two turns, which may be provided by a spiral, in particular the two turns may be substantially coplanar and form a planar spiral. Each of the portions of the primary winding 51 is coupled in series so as to provide a primary winding 51 having 12 turns.

The input 67 to the primary winding 51 is coupled to the outermost end of the two turns of the planar spiral arranged on the second layer 54. The innermost end of the planar spiral on the second layer 54 is coupled to the innermost end of the planar spiral providing a portion of the primary winding 51 arranged on the fourth layer 26. The outermost end of the planar spiral providing a portion of the primary winding arranged on the fourth layer 56 is electrically coupled to the outermost end of the planar spiral providing a portion of the primary winding 51 arranged on the sixth layer 58. The inner end of the planar spiral providing a portion of the primary winding 51 arranged on the sixth layer 58 is coupled to the inner end of the planar spiral providing a portion of the primary winding 51 arranged on the seventh layer 59. The outer and of the planar spiral providing a portion of the primary winding 51 arranged on the seventh layer 59 is electrically coupled to the outermost end of the planar spiral providing a portion of the primary winding 51 arranged on the ninth layer 61. The inner end of the planar spiral providing a portion of the primary winding 51 arranged on the ninth layer 61 is electrically coupled to the inner end of the planar spiral providing a portion of the primary winding arranged on the eleventh layer 63 and the outermost end of the planar spiral providing a portion of the primary winding 51 arranged on the eleventh layer 63 provides the output 68 of the primary winding 51.

The winding arrangement 50 illustrated in FIG. 2 may be provided by a stack of planar conductive traces providing the portions of the primary winding 51 and secondary winding 52 which are electrically insulated from one another by intervening electrically insulating layers. The vertical electrical connections between the conductive traces on the stacked layers may be made by conductive vias or through-contacts which extend perpendicularly to the planar conductive traces through the intervening electrically insulating layers.

Figure 3:
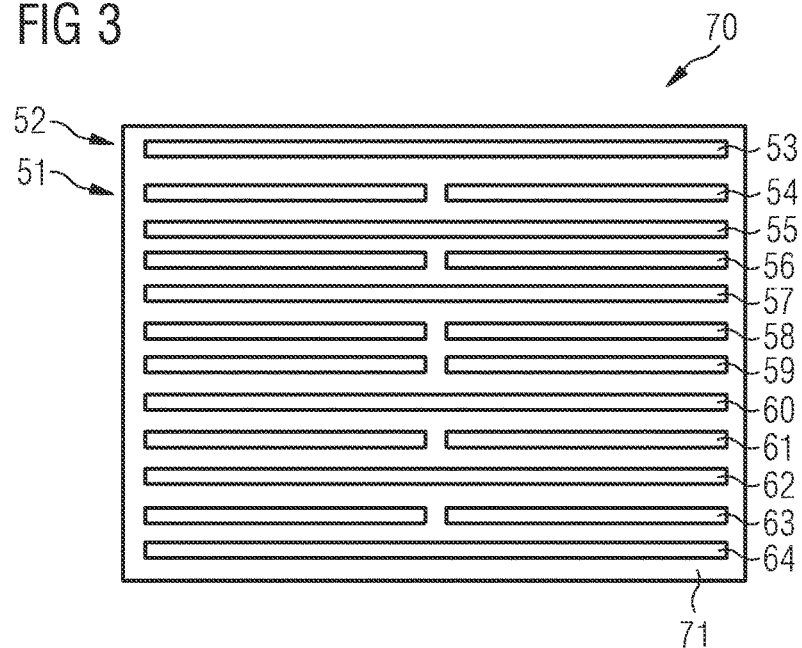
FIG. 3 illustrates a schematic side view of a stacked structure for providing a primary and secondary winding for a hybrid transformer.

FIG. 3 illustrates a schematic side view of a winding module having a stacked structure 70 for providing such a primary winding 51 and secondary winding 52 for a hybrid transformer. The layers providing the portions of the primary winding 51 and secondary winding 52 are indicated in FIG. 3 with the same reference number as in FIG. 2. The intervening electrically insulating layers are indicated generally with the reference number 71 in FIG. 3.

The layers 53, 55, 57, 60, 62 and 64 providing the secondary winding 52 are each illustrated as a continuous metal conductive layer, whereas the layers 54, 56, 58, 59, 61, 63 include two conductive portions in the cross-sectional view of FIG. 3 indicating the two turns of the primary winding 51 arranged on each layer. The conductive traces of the layers 53, 55, 57, 60, 62 and 64 providing the secondary winding 52 may be electrically coupled in parallel by conductive vias, which cannot be seen in the cross-sectional view of FIG. 3, extending vertically between the layers 53, 55, 57, 60, 62 and 64. These vias may extend throughout the stack since the layers 53, 55, 57, 60, 62 and 64 are electrically coupled in parallel.

The conductive traces of the layers 54, 56, 58, 59, 61, 63 providing the primary winding 51 are also electrically connected by conductive vias extending vertically, which cannot be seen in the cross-sectional view of FIG. 3. These conductive vias are arranged so as to extend between neighbouring layers providing portions of the primary winding 51 so as to electrically couple neighbouring portions of the primary winding 51 in series. The conductive vias of the primary winding 51 extend though only a portion of the stack such that the turns arranged on the various layers are coupled in series to provide a single conductive layer from the second layer 54 to the eleventh layer 63. For example, one or more conductive vias may extend between the second layer 54 and the fourth layer 56, one or more conductive vias may extend between the fourth layer 56 and the sixth layer 58, one or more conductive vias may extend between the sixth layer 58 and the seventh layer 59, one or more conductive vias may extend between the seventh layer 59 and the ninth layer 61 and one or more conductive vias may extend between the ninth layer 61 and the eleventh layer 63 to form a single conductive layer from the second layer 54 to the eleventh layer 63 and to form the primary winding 51 having 12 turns.

Figure 4:
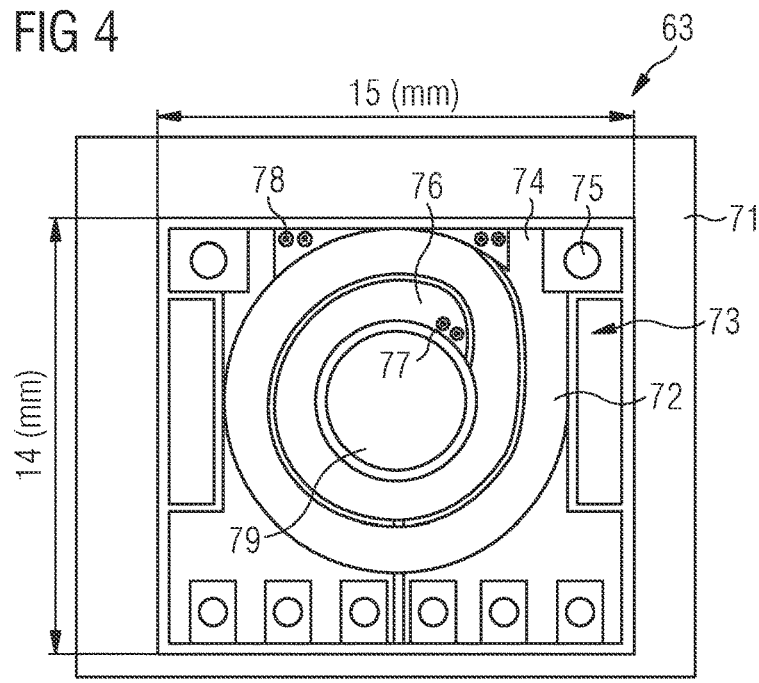
FIG. 4 illustrates a plan view of a layer providing a portion of a primary winding suitable for use in a stacked structure.

FIG. 4 illustrates a plan view of a layer, for example layer 63 of the stack illustrated in FIG. 3, providing a portion of the primary winding 51. FIG. 4 illustrates a conductive trace 72 that has the form of a planar spiral 73 with two turns which is supported by an insulating layer 71. The outer end 74 of the planar spiral is electrically coupled to a conductive pad 75 which provides the input to the planar spiral. The conductive pad 75 may be electrically coupled to a conductive via extending to a further conductive trace that is arranged in a plane above the plane of the drawing and also forms part of the primary winding 51. The innermost end 76 of the planar spiral includes one or more conductive vias 77 which extend downwardly through the thickness of the substrate 71 and may be coupled to a further conductive trace that is arranged in a plane below the plane of the drawing and that also forms part of the primary winding. The electrically insulating layer 71 also includes conductive vias 78 which are electrically isolated from the conductive trace 73 and provide a portion of the conductive vias coupling the layers 53, 55, 57, 60, 62 and 64 providing the secondary winding 52.

An aperture 79 is arranged at the centre of the planar spiral 73 for accommodating a magnetic core of the hybrid transformer.

Figure 5:
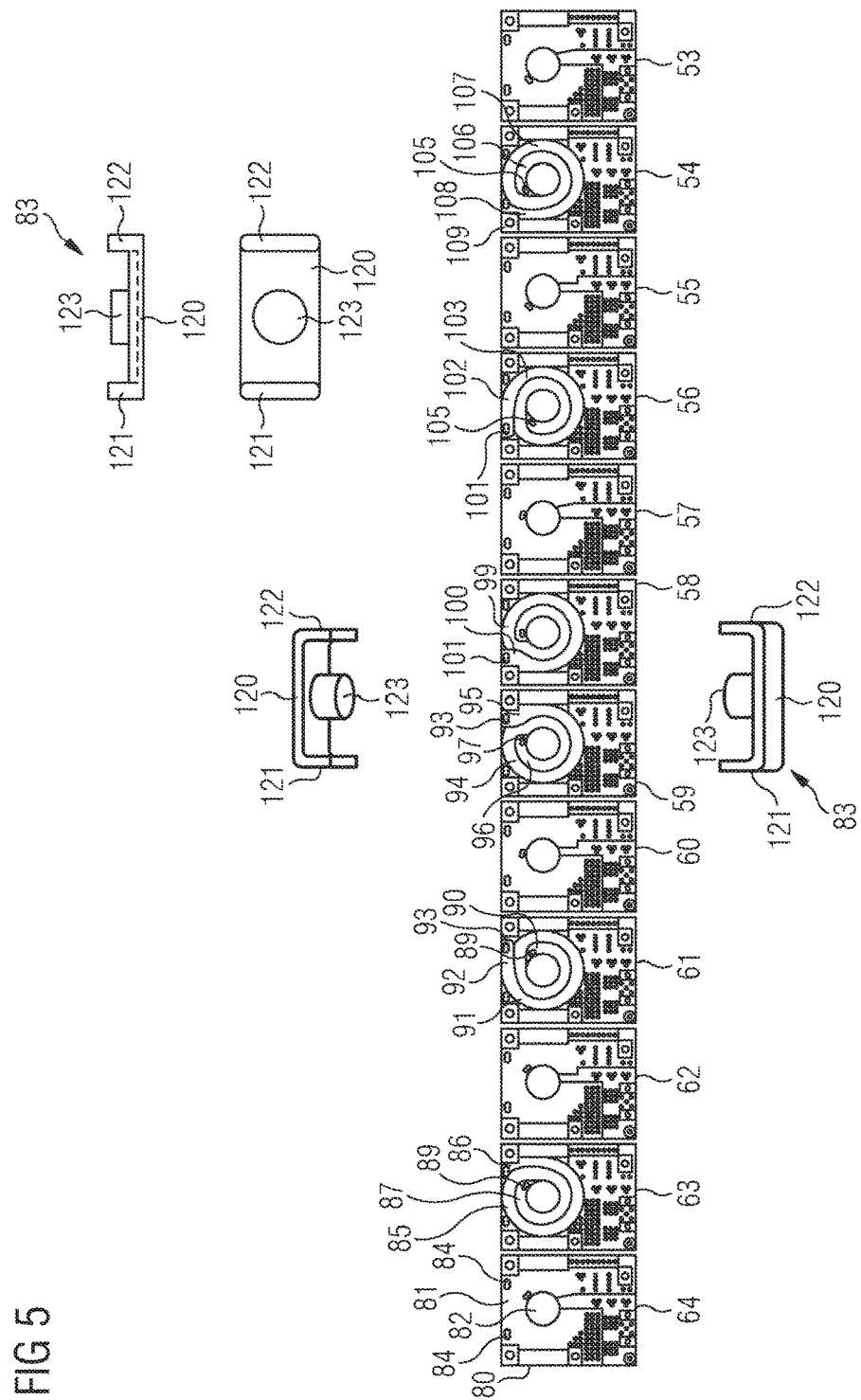
FIG. 5 illustrates plan views of 12 layers which may be arranged in the stack to provide a primary winding and a secondary winding for a hybrid transformer and a magnetic core.

FIG. 5 illustrates plan views of the 12 layers 53-64 which may be arranged in the stack 80 to provide a primary winding 51 and a secondary winding 52 for a hybrid transformer and also illustrates a magnetic core for the hybrid transformer. The stack 80 may be provided in the form of a winding module.

Each of the layers 53 to 64 is supported by an electrically insulating layer 71 having a surface 80 on which a structured conductive layer 81 is arranged. The insulating layer 71 may be provided by a dielectric core layer as is used in the production of a circuit board, such as a printed circuit board (PCB), or other electrically insulating layer such as a thermosetting resin, for example a pre-preg layer as also used in the production of a circuit board. Each electrically insulating layer 71 may include an aperture 82 that is aligned vertically to form a single aperture extending throughout the thickness of the stack. The aperture 82 may be sized, shaped and arranged to accommodate a portion of the magnetic core 83 for forming a transformer, such as a hybrid transformer in which the output of the primary winding is electrically connected to the input of the secondary winding. The conductive layer 81 surrounds the aperture 82 and is spaced apart and electrically insulated from the aperture 82 by a portion of the electrically insulating layer.

The layers forming the secondary winding 52, that is layers 53, 55, 57, 60, 22 and 64 of the stack, each include a single conductive turn. Each of the conductive traces 81 of the layers 53, 55, 57, 60, 22 and 64 of the secondary winding 52 are electrically coupled in parallel by conductive vias 84 that extend throughout the thickness of the stack. The vias 84 also extend through the intervening layers 54, 56, 58, 59, 61 and 63 which include portions of the primary winding. However, in contrast to the layers 53, 55, 57, 60, 22 and 64 providing the secondary winding 52, the vias 84 positioned in the layers 54, 56, 58, 59, 61 and 63 providing the primary winding 51 are electrically insulated from the conductive layer 81 of that layer.

As mentioned above in connection with FIG. 4, each of the layers providing a portion of the primary winding 51 includes a conductive layer patterned to form a planar spiral having two turns. The two turns surround an aperture 82. In order to electrically couple the layers 54, 56, 58, 59, 61 and 63 by means of conductive vias that extend perpendicularly to the plane of the layer and to provide a primary winding 51 with an larger number of turns, one of the inner and outer end of the planar spiral on each of the layers 54, 56, 58, 59, 61 and 63 providing portions of the primary winding 51 may be angularly offset with respect to its nearest neighbour in the stack and the other one of the inner end and the outer end of the planar spiral may be vertically and angularly aligned with respect to its nearest neighbour in the stack. In particular, the angular offset may refer to an angle in the plane of the layer about a centre point of the planar spiral, for example clockwise or anticlockwise about a centre point of the planar spiral.

The layer 63 includes a planar spiral 85 having two turns which surround the aperture 82. The planar spiral 85 includes an outer end 86 and an inner end 87. The inner end 87 is coupled to a conductive via 89 which extends through the adjacent layer 62 and is coupled with an inner end 90 of planar spiral 91 arranged on the layer 61 so as to electrically couple the planar spiral 85 on the layer 63 with the planar spiral 91 on the layer 61 in series.

The planar spiral 91 has two turns extending in a clockwise direction from the inner end 90 to the outer end 92. The inner end 90 of the planar spiral is angularly and vertically aligned with the inner end 87 of the planar spiral 85, whereas the outer end 92 is angularly offset with respect to the outer end 86 of the planar spiral 85 on the underlying layer 63. The outer end 92 is electrically coupled to a conductive via 93 which extends through the adjacent secondary layer 60 to the outer end 95 of a planar spiral 94 arranged on the layer 59. The outer end 92 is angularly aligned with the outer end 95 of the planar spiral 94 arranged on the overlying layer 59 and angularly offset with respect to the outer end of the planar spiral 85 on the underlying layer 63.

The planar spiral 94 also has two turns extending in a clockwise direction and having an inner end 96 coupled to a conductive via 97 which extends through the electrically insulating support layer 71 between the layers 59 and 58 so as to couple the inner end 96 of the spiral planar spiral 94 to the inner end 98 of a planar spiral 99 arranged on the layer 58. The inner end 96 of the planar spiral 94 is angularly offset with respect to the inner end 90 of the planar spiral 91 on the underlying layer 61.

The planar spiral 99 extends in a clockwise direction from the inner end 98 to an outer end 100. The outer end 100 is electrically coupled to a conductive via 101 which extends through the adjacent layer 57 which provides a portion of the secondary winding 52 to an outer end 102 of a planar spiral 103 arranged on the layer 56.

The planar spiral 103 extends in a clockwise direction in two turns to an inner end 104 which is coupled by conductive via 105 which extends through the layer 55 to an inner end 106 of a planar spiral 107 arranged on the layer 54. The inner end 104 of the planar spiral 102 is vertically aligned with the inner end 106 of the planar spiral 107 of the overlying layer and angularly offset with respect to the inner end 98 of the planar spiral on the underlying layer 58. The outer end 102 of the planar spiral 103 is vertically aligned with the outer end 100 of the planar spiral 99 on the underlying layer 59 and angularly offset with respect to the outer end 108 of the planar spiral 107 of the overlying layer 53.

The inner end 106 of the planar spiral 107 extends in a clockwise direction for two turns to an outer end 108 which is coupled to a contact pad 109.

The planar spirals 85, 91, 94, 99, 103, 107 arranged in a vertical stack are electrically coupled together by conductive vias suitably arranged to couple the turns of the planar spirals 85, 91, 94, 99, 103, 107 provided on each layer in series. Sequential conductive vias coupling inner ends of the planar spirals 85, 91, 94, 99, 103, 107 are sequentially angularly offset. Similarly, sequential conductive vias coupling outer ends of the planar spirals 85, 91, 94, 99, 103, 107 are sequentially angularly offset.

To summarise, the planar spirals 85, 91, 94, 99, 103, 107 may be coupled in series by one or more conductive vias extending between adjacent ones of the planar spirals. For example, an output end of a first planar spiral may be vertically aligned with an input end of a second planar spiral, the second planar spiral being adjacent the first planar spiral in the stack. An output end of the second planar spiral may be angularly offset with respect to the input end of the second planar spiral and vertically aligned with an input end of a third planar spiral, the third planar spiral being arranged on a side of the second planar spiral that opposes the first planar spiral.

A conductive secondary layer may be arranged between the first planar spiral and the second planar spiral, the output end of the first planar spiral is electrically coupled with the input end of the second planar spiral by a conductive via that extends through and is electrically insulated from the conductive secondary layer. The conductive secondary layer is electrically insulated from the first planar spiral and from the second planar spiral by an insulating layer. The insulating layer may comprise a thermosetting resin, such as an epoxy resin. The aperture may extend through the conductive primary layers and the conductive secondary layers.

Figure 6:
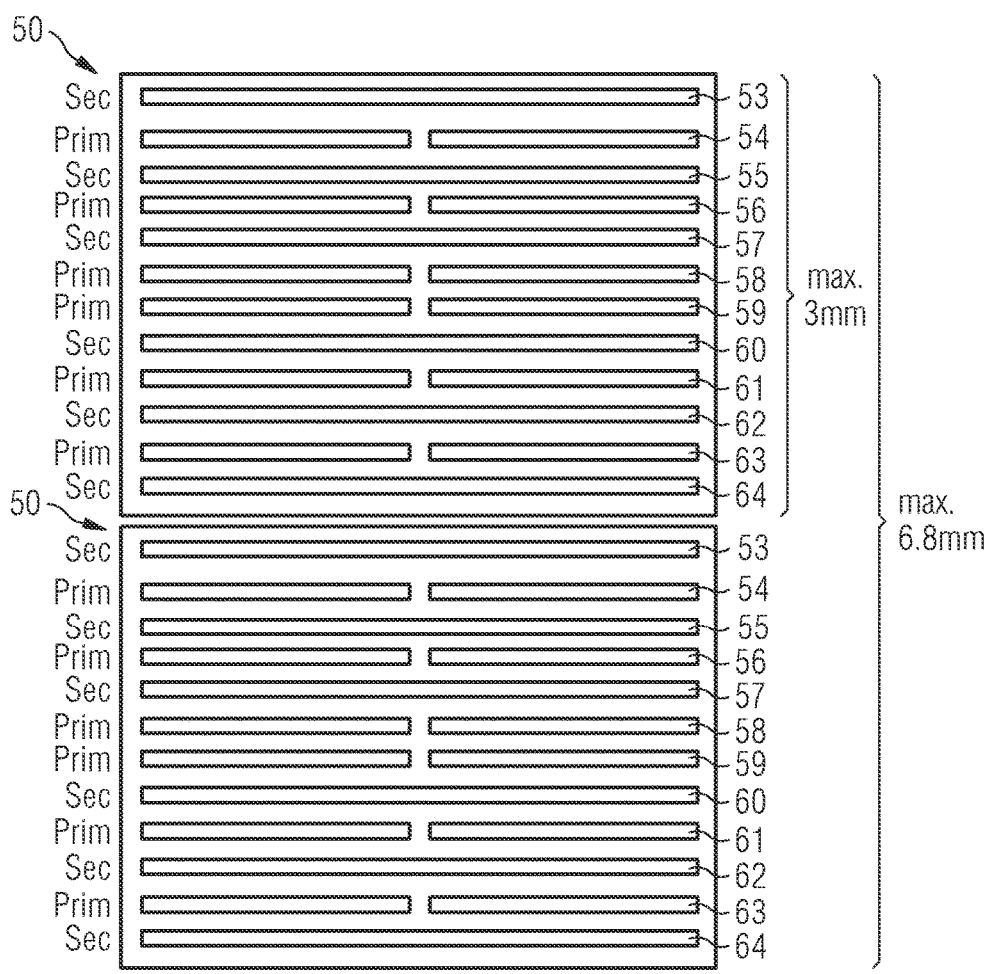
FIG. 6 illustrates a schematic side view of a stacked structure for providing a primary winding and a secondary winding for a hybrid transformer.
Figure 7:
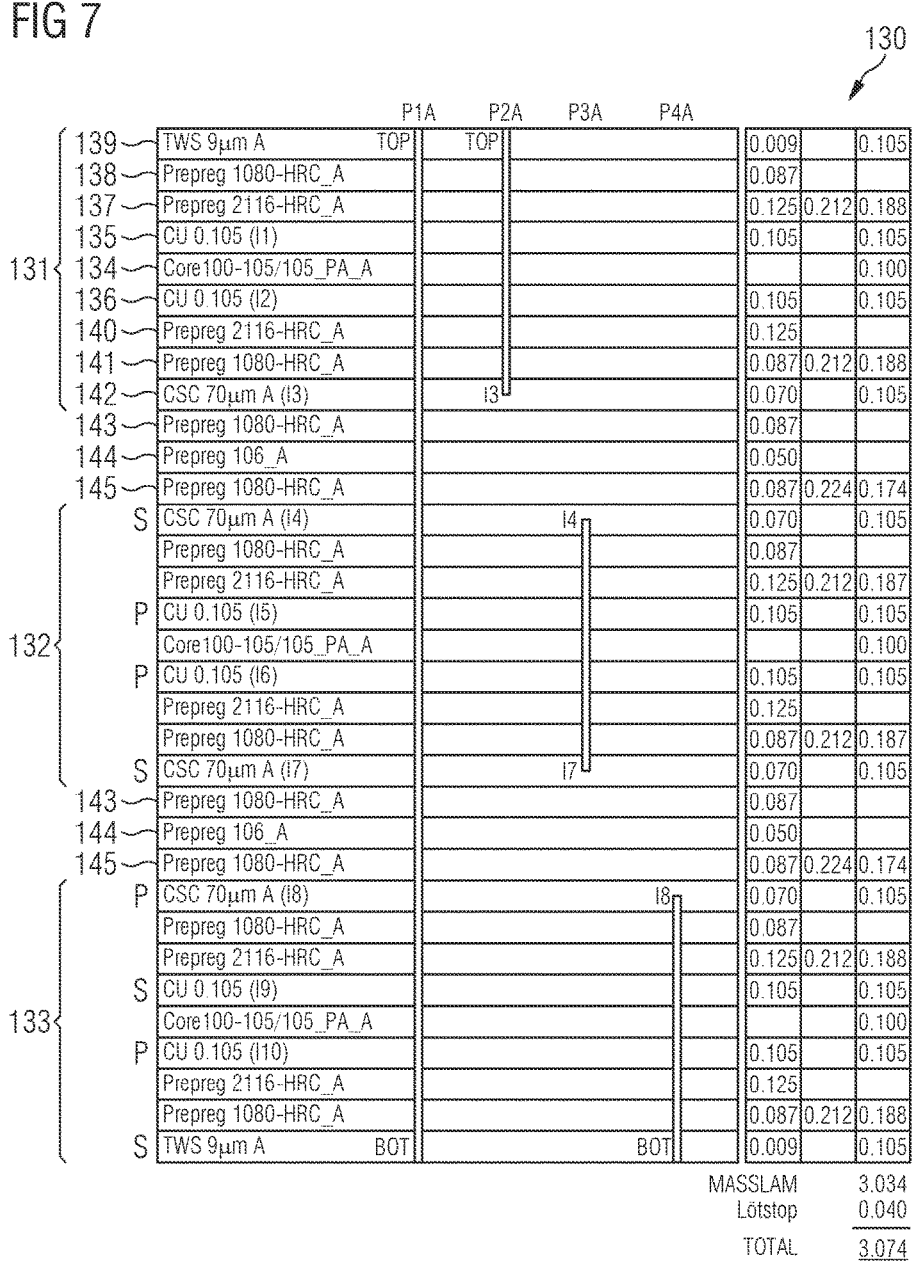
FIG. 7 illustrates a schematic view of a stacked structure for providing a primary winding and a secondary winding for a hybrid transformer.

Whilst in the embodiment illustrated in FIGS. 5 to 7 includes 12 conductive layers and the primary winding includes 12 turns with 2 turns arranged on 6 layers, the winding arrangement, stack and winding module are not limited to this particular number of conductive layers, turns or distribution of turns amongst the layers. For example, the primary winding may include more than 12 turns for example 24 turns. Each layer may include fewer or more than two turns. The number of conductive layers may be greater or less than 12.

The layers 53-64 are arranged in a stack and attached to one another to form a winding module. The winding module has aperture that extends throughout the thickness of the stack for accommodating a magnetic core.

In an embodiment, winding module for a hybrid transformer is provided that comprises a primary winding that is electrically coupled in series with a secondary winding. Such an arrangement is also referred to as tapped transformer. The primary winding comprises a first conductive trace arranged on a planar support and the secondary winding comprises a second conductive trace arranged on the planar support. The first conductive trace and the second conductive trace are arranged in a stack and the planar support comprises an aperture for accepting a magnetic core. The stack extends in a stacking direction that is perpendicular to a major plane of the first and second conductive traces.

The primary winding may comprise a plurality of conductive primary layers and the secondary winding may comprise a plurality of conductive secondary layers, the conductive primary layers and the conductive secondary layers being arranged on the planar support in a stacked arrangement. The conductive primary layers may each comprise a planar spiral with at least one turn. In some embodiments, the planar spiral has two turns. The two turns may be of differing width, for example the inner turn may have a smaller width than the outer turn. For planar spiral having more than two turns, the width of sequential turns may sequentially increase from the inside to the outside of the planar spiral.

The conductive secondary layers may be coupled in parallel by a common conductive via extending substantially perpendicularly to the planar support. In this embodiment, the conductive secondary layers may provide a single turn. The secondary winding may have a number of turns that is less than the number of secondary layers. In some embodiments, groups of the conductive secondary layers may be coupled together to provide a secondary winding with more than one turn. Each group may provide a single turn.

The electrically insulating layers 71 provide a planar support structure for the conductive traces and planar spirals. In some embodiments, the electrically insulating layers 71 and have a lateral extent such that a portion of the electrically insulating layer 71 adjacent the traces of the windings may be used for supporting further components of the module. The uppermost electrically insulating layer may include additional components, such as the synchronous rectifier and the output capacitor for providing the circuit illustrated in FIGS. 1a and 1b, and the remaining layers may form or support part of a conductive redistribution structure. In some embodiments, the portion of the conductive layers providing the secondary winding which is coupled to ground may also provide a ground connection for further components of the hybrid transformer.

In some embodiments, the winding module 80 is provided with a magnetic core to form a hybrid transformer. The magnetic core may comprise a central protruding portion that protrudes into the aperture in the planar support and two outer arms that extend adjacent two opposing side faces of the planar support.

In some embodiments, such as that illustrated in FIG. 5, the magnetic core 83 includes two portions, each of which having a so-called E shape in which a base portion 120 includes two side arms 121 122 and a central portion 123. The central portion 123 and the aperture 82 may be sized shaped and arranged to interlock. The size of the base 120 and arms 121, 122 may be sized, and shaped and spaced apart from the central portion 123 such that the electrically insulating support layer 71 may be accommodated within the arms 121, 122.

Due to the use of stacked structure, in which the primary winding and the secondary winding are formed by a stack of planar conductive layers electrically coupled vertically by conductive vias, a compact arrangement for the winding module can be provided. As mentioned above, the step-down ratio provided by the winding module may be set by appropriate selection of the number of turns N1 of the primary winding with respect to the number of turns N2 of the secondary winding.

In some embodiments, the magnetic core is without an air gap or gapless. The lack of an air gap is useful in reducing the volume of the hybrid transformer.

In some embodiments, the magnetic core comprises a magnetic material having a permeability at 100 MHz of at least 60 and core losses of less than 90 kW/m$^3$, preferably less than 60 kW/m$^3$. These properties may be used to improve the conversion efficiency of the hybrid transformer and circuit in which it is used.

In some embodiments, the magnetic material has a glass transition temperature $T_g$ of 740K or less, preferably less than 710K or less. The magnetic material may have a melting point $T_m$ and the ratio of the glass transition temperature to the melting point, $T_g/T_m$, may be greater than 0.52, i.e. $T_g/T_m > 0.52$. These properties may be useful for producing a magnetic core material that is used in amorphous form in the magnetic core.

In some embodiments, the magnetic core comprises a composite comprising a matrix and an amorphous magnetic powder. The amorphous magnetic power comprises particles having an aspect ratio of 1.1 to 1.4. The amorphous magnetic powder may comprise $(Fe_{100-a-b-c-x-y-z-t}Ni_aSn_bCr_cP_xC_yB_z$-$Si_t)_{100-\alpha}M_\alpha$, wherein 0 at %≤a≤10 at %, 0 at %≤b≤3 at %, 0 at %≤c≤6 at %, 6.8 at %≤x≤10.8 at %, 2.2 at %≤y≤9.8 at %, 0 at %≤z≤4.2 at %, 0 at %≤t≤3.9 at %, wherein M is at least one metal selected from the group consisting of Ti, Al, Mn, Zr, Hf, V, Nb, Ta, Mo and W and 0.04 wt %≤α≤0.6 wt %, whereby at % refers to atomic percent and wt % refers to weight percent. In one particular embodiment, the magnetic core comprises $(Fe_{71.4}Ni_6Cr_2P_{10.8}C_{7.8}B_2)_{100-\alpha}M_\alpha$ and M is Ti, Al and Mn, wherein Al is more than 0 wt % and less than 0.05 wt %. In another particular embodiment, the magnetic core includes a matrix and an amorphous magnetic powder comprising $(Fe_{71.4}Ni_6Cr_2P_{10.8}C_{7.8}B_2)_{100-\alpha}M_\alpha$ and M is Ti, Al and Mn, wherein Al is more than 0 wt % and less than 0.05 wt %.

In an alternative embodiment, the magnetic core comprises ferrite and the module further comprises an inductor coupled to a first end of the primary winding, the synchronous rectifier being coupled to a second end of the primary winding opposing the first end and to a first end of the secondary winding that is also coupled to the second end of the primary winding.

FIG. 6 illustrates a schematic side view of a winding module 125 for hybrid transformer which includes two groups of 12 layers having the arrangement of the winding module 70 illustrated in FIG. 3. By increasing the number of turns N1 of the primary winding compared to the number of turns N2 of the secondary winding, the step-down ratio can be increased. As will be discussed in more detail with reference to FIG. 7, a stack of 12 conductive layers may have a maximum height of 3 mm and a stack of 24 conductive layers may have a maximum height of 6.8 mm.

As mentioned above, the winding module may be fabricated using PCB manufacturing techniques. FIG. 7 illustrates a cross-sectional diagram of a stack for a winding module 130 including 12 conductive layers. In embodiments in which each of the primary layers provides two conductive turns and the secondary layers together provide one conductive turn, a step down ratio of 12 to 1 can be provided. However, the winding module is not limited to this number of conductive layers or ratio of turns n and step-down ratio. For example a step-down ratio of 24 to 1 or greater may be provided.

In some embodiments, the winding stack may be formed from one or more substacks which may be prefabricated and the substacks are joined together to form a winding stack. The substacks may be provided in the form of submodules which are joined together to form a winding module. A submodule may include additional features over a substack, such as a conductive redistribution structure for further components.

The winding module 130 may include three submodules 131, 132, 133. The first submodule 131 includes a core layer 134 which, for example, includes a fibre reinforced dielectric matrix as is used as a core layer in PCB manufacturing. The submodule 131 includes a first conductive layer 135 and a second conductive layer 136 arranged on opposing major surfaces of the core layer 134. The submodule 131 includes two layers of pre-preg 137, 138 arranged in turn on the first conductive layer 135 and a further conductive layer 139 arranged on the outermost pre-preg layer 138. The first submodule 131 includes two further pre-preg layers 140, 141 arranged in turn on the second conductive layer 136 and a further conductive layer 142 arranged on the outermost pre-preg layer 141. The submodules 132, 133 include the same structure in terms of the stack of materials. The submodules 131, 132, 133 are arranged in the stack by the use of three layers of pre-preg 143, 144, 145 arranged between outermost conductive layers of adjoining submodules.

The core layer may include woven glass fibres impregnated with an epoxy resin and may include FR4 or BT laminate (Bismaleimide-Triazine), for example. Pre-preg denotes a dielectric layer which includes partially cured or B-stage resin impregnated woven glass fibres or fully cured resin impregnated woven glass fibres. The resin may be a thermosetting resin such as an epoxy resin. The conductive layers may include copper.

The composition and thickness of the pre-preg layers may differ depending on the position of the pre-preg layer within the submodule and the position of the pre-preg layer arranged in the stack between the submodules.

In some embodiments, the conductive layers 135, 136 arranged directly on the core layer 134 may have a greater thickness than the conductive layers 142 arranged on the pre-preg layers 141. The outermost conductive layers may have a different composition. A solder resist layer may be arranged on the outermost conductive layers and may include openings defining contact pads. The contact pads may be coupled to the primary winding and/or secondary winding, output capacitor etc. for forming the circuit illustrated FIGS. 1a and 1b.

The conductive layers may be structured to provide the portions of the secondary winding 52 and primary winding 51 having a stacking order corresponding to that illustrated in FIGS. 2 to 5, for example. In this embodiment, the first submodule 131 includes conductive layers providing, from top to bottom in the view of FIG. 7, a secondary primary secondary primary arrangement in the vertical stack. The third submodule 133 also includes stack in which the conductive layers provide from bottom to top in the view of FIG. 7, a secondary primary secondary primary arrangement. The two submodules 131, 133 are arranged in the stack such that the secondary layers provide the outermost surface and the primary layer is arranged towards the centre of the stack.

The second submodule 132 includes an arrangement of the conductive layers providing, from top to bottom in the view of FIG. 7, a secondary primary secondary arrangement. In this embodiment, conductive layers including portions of the primary winding 51 are arranged directly on the core layer on the central second submodule 132, whereas in the remaining two outer submodules 131, 133 one of the conductive layers arranged on the core layer provides a secondary portion of the secondary winding and the other conductive layer arranged on the core layer provides a portion of the primary winding.

The first substack and a third substack, as included in the first submodule 131 and third submodule 133 for example, may each comprising equal numbers of conductive primary layers and conductive secondary layers arranged alternately in a stacking direction. A second substack, as included in the second submodule 132, may comprise two conductive primary layers arranged adjacent one another in a stacking direction, wherein the second substack is arranged between the first substack and the third substack.

The first substack comprises a core layer having a first major surface and a second major surface, a conductive primary layer arranged on the first major surface, a first thermosetting layer arranged on the conductive primary layer, a conductive secondary layer arranged on the first thermosetting layer, a conductive secondary layer arranged on the second major surface, a second thermosetting layer arranged on the conductive secondary layer and a conductive primary layer arranged on the second thermosetting layer. The core layer may be a dielectric core layer including a reinforced thermosetting matrix, for example. The first and second thermosetting layers may include an epoxy resin and may include a B-stagable thermosetting material.

The third substack may comprise a core layer having a first major surface and a second major surface, a conductive primary layer arranged on the first major surface, a first thermosetting layer arranged on the conductive primary layer, a conductive secondary layer arranged on the first thermosetting layer, a conductive secondary layer arranged on the second major surface, a second thermosetting layer arranged on the conductive secondary layer and a conductive primary layer arranged on the second thermosetting layer.

The second substack may comprises a core layer having a first major surface and a second major surface, a conductive primary layer arranged on the first major surface, a first thermosetting layer arranged on the conductive primary layer, and a conductive secondary layer arranged on the first thermosetting layer, a conductive primary layer arranged on the second major surface, a second thermosetting layer arranged on the conductive primary layer and a conductive secondary layer arranged on the second thermosetting layer.

The winding module may further comprise at least one further thermosetting layer arranged between the first substack and the second substack and at least one further thermosetting layer arranged between the second substack and the third substack. The at least one further thermosetting layers may be used to mechanically join the first, second and third substacks to form the stack or winding module in the case that the first, second and third substacks are provided in the form of first, second and third submodules.

FIG. 8a illustrates a top view and FIG. 8b a side view of an exemplary module 150 for power conversion. The module 150 includes the components and circuit of the module 40 illustrated in FIGS. 1a and 1b.

The exemplary module 150 includes a hybrid transformer 151 including a winding module with a primary winding having a number of turns N1 which is electrically coupled in series to a secondary winding having a number of windings N2 so as to provide a DC-DC conversion step down ratio of at least 12 to 1 or at least 24 to 1. The hybrid transformer 151 further includes a magnetic core 152. The magnetic core 152 includes two E-shaped portions which are arranged on either side of winding module including the primary winding and secondary winding. The top view illustrates the upper side of the base of one of the magnetic core regions with the arms and central portion of the E-shape protruding into the plane of the paper. The module 150 also includes one or more secondary side MOSFET devices 153, which may provide the synchronous rectifier or switch S3 of the circuit illustrated in FIG. 1a and one or more discrete capacitors 154 providing the output capacitance. As illustrated in FIG. 8a, the module has a lateral size of 15 mm by 18 mm and the hybrid transformer 151 may have a lateral size of 15 mm×11 mm. The module 150 has a thickness of around 9.4 mm giving it a volume of 2.538 cm$^3$. The power rating for the transformer is 75 W which gives power density to the module, that is power rating per unit volume of 29.55 W per cm$^3$.

Features of the circuit illustrated in FIG. 1a, winding module, hybrid transformer and module may be further adjusted to further improve one or more properties.

Figure 9:
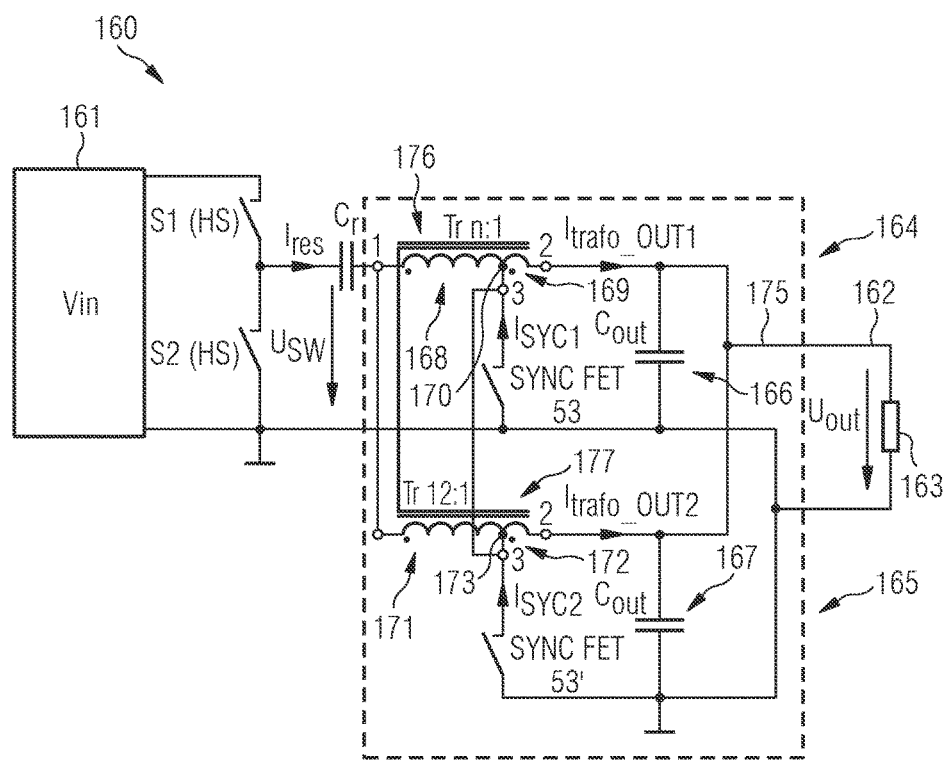
FIG. 9 illustrates a DC-DC conversion circuit including two hybrid transformer stages coupled in parallel.

FIG. 9 illustrates a circuit 160 for DC-DC power conversion which has step down ratio of at least 12 to 1. The circuit 160 includes an input terminal 161 for receiving an input voltage, for example a 48 V DC power supply, and an output terminal 162 coupled to a load 163. The circuit 160 also includes half-bridge circuit including a first switch S1 and a second S2 and resonant capacitor Cr. In contrast to the circuit illustrated in FIGS. 1a and 1b, the circuit 160 includes two hybrid transformer stages 164, 165 coupled in parallel. Each of the hybrid transformer stages 164, 165 includes a switch S3, S3' and an output capacitor 166, 167.

The first hybrid transformer stage 164 includes a primary winding 168 which is electrically coupled in series to a secondary winding 169. The output of the synchronising rectifier S3 is electrically coupled to a node 170 arranged between the output of the primary winding 168 and the input to the secondary winding 162. The input to the synchronising rectifier S3 is coupled to ground. The synchronising rectifier S3 may be a MOSFET device, whereby Source is coupled to Ground and Drain to the node 170. The output capacitor 166 is coupled between the output of the secondary winding 169 and ground.

The second hybrid transformer stage 165 also includes a primary winding 171 that is electrically coupled in series to a secondary winding 172. The input of the primary winding 171 is coupled to the input of the primary winding 168 of the first hybrid transformer stage 164. The output of the synchronising switch S3' is electrically coupled to a node 173 between the output of the primary winding 171 and the input to the secondary winding 172 and to the output of the synchronising switch S3 of the first hybrid transformer stage 164 and to the node 170 between the primary winding 168 and secondary winding 162 of the first hybrid transformer stage 164. The second hybrid transformer stage 165 also includes an output capacitor 167 which is electrically coupled between ground and the output of the secondary winding 172 of the second hybrid transformer stage 165 and the output of the secondary winding 169 of the first hybrid transformer stage 164 to form a common output 175.

The first hybrid transformer stage 164 includes a magnetic core 176 magnetically coupling the primary winding 168 and secondary winding 169. Similarly, the secondly hybrid transformer stage 164 includes a magnetic core 177 magnetically coupling the primary winding 171 and secondary winding 172.

The load 163 is coupled between ground and the common output 175 of the two hybrid transformers 164, 165 so that the two hybrid transformer stages 164, 165 are coupled in parallel between the resonant capacitor Cr and the load 163.

The first hybrid transformer stage 164 and its synchronising switch S3 and capacitor output capacitor 166 and the second hybrid transformer stage 165 and its associated synchronising switch S3' and an output capacitor 167 may be provided by a single module.

In embodiments in which the primary and secondary windings of two or more hybrid transformer stages are arranged on a single support substrate and provided by single module, a common magnetic core may be used. This arrangement further reduces the volume of the core and consequently, the volume of the transformer.

In some embodiments, the step down ratio provided by the first hybrid transformer 164 and the second hybrid transformer 165 may differ. This may be achieved by providing differing first turns ratio n for the primary winding 168 and secondary winding 169 of the first hybrid transformer stage 164 and the primary winding 171 and secondary winding 172 of the second hybrid transformer stage 165.

The switches S1, S2 providing the half bridge on the input side and the switches providing the synchronising rectifier S3' may be MOSFET devices and may be coupled to driver circuitry which is not illustrated in FIG. 9.

The DC-DC power conversion circuit is not limited to including two hybrid transformer stages coupled in parallel between the resonant capacitor on the input side and the load but may include three or more hybrid transformers stage, each having a hybrid transformer and associated synchronising rectifier and output capacitor, that are coupled in parallel between the resonant capacitor and load.

The use of two or more parallel hybrid transformer stages may be used to achieve a more uniform efficiency over a range of loads. Due to the very high current density, in which the secondary side current may be up to 1.5 times higher than the DC output current, the main loss contributors are conduction losses. By using a paralleling approach of the hybrid transformer stages, the current density can be reduced in the critical path and may lead to resistive conduction losses of a reduction in resistive conduction losses of 50%.

Each hybrid transformer stage and its associated synchronous switch and output compost capacitor may be provided by a separate module. In some embodiments, however, the primary and secondary windings of two or more hybrid transformer stages may be formed on a first support substrate and the electrical connections to couple the primary and secondary windings of the two or more hybrid transformer stages in parallel, and the synchronous switches and output capacitors may be provided on a second support substrate.

FIG. 10 illustrates an example of a primary winding including a conductive trace of varying width. The conductive trace has the form of a planar spiral having two turns that is supported on a planar substrate.

Skin effects may be taken into account when selecting the thickness of the conductive material, e.g. a metal such as copper, used for the conductive trace. If the switching frequency is very high (several 100 kHz) winding losses based on the skin effect and proximity effect is not negligible. For the skin effect, the relationship of d<2 δ, where d is thickness of the winding, δ is skin depth may be used.

For an operating switching frequency of the power module between 500 kHz to 700 kHz, the effective skin depth is between 92 μm to 78 μm. A thickness of 105 μm for the conductive traces may be used. The conductive traces may be copper.

The winding width may be selected to obtain a lower dc resistance. For a primary winding with two turns per layer, a relationship $R_{DC} = (\rho \cdot l_t \cdot N)/Aw_{layer}$, where ρ is the resistivity of copper, $l_t$ is the average length of a turn, N is the number of turns, and $A_{layer}$ is the cross-sectional area of the winding layer may be used. For a planar spiral, the turns may be of differing width. For a primary winding having two turns, the inner turn may have a width of 1.15 mm and the outer turn a width of 1.65 mm. For a secondary winding with 6 turns in parallel, the full available winding area may be used to have a secondary winding width of 3 mm.

The combination of the circuits illustrated in FIGS. 1a and 9 and the use of a material for the magnetic core of the hybrid transformer which enables a transformer design without an air gap may be used to increase conversion efficiency and at the same time provide a high power density.

Figure 11:
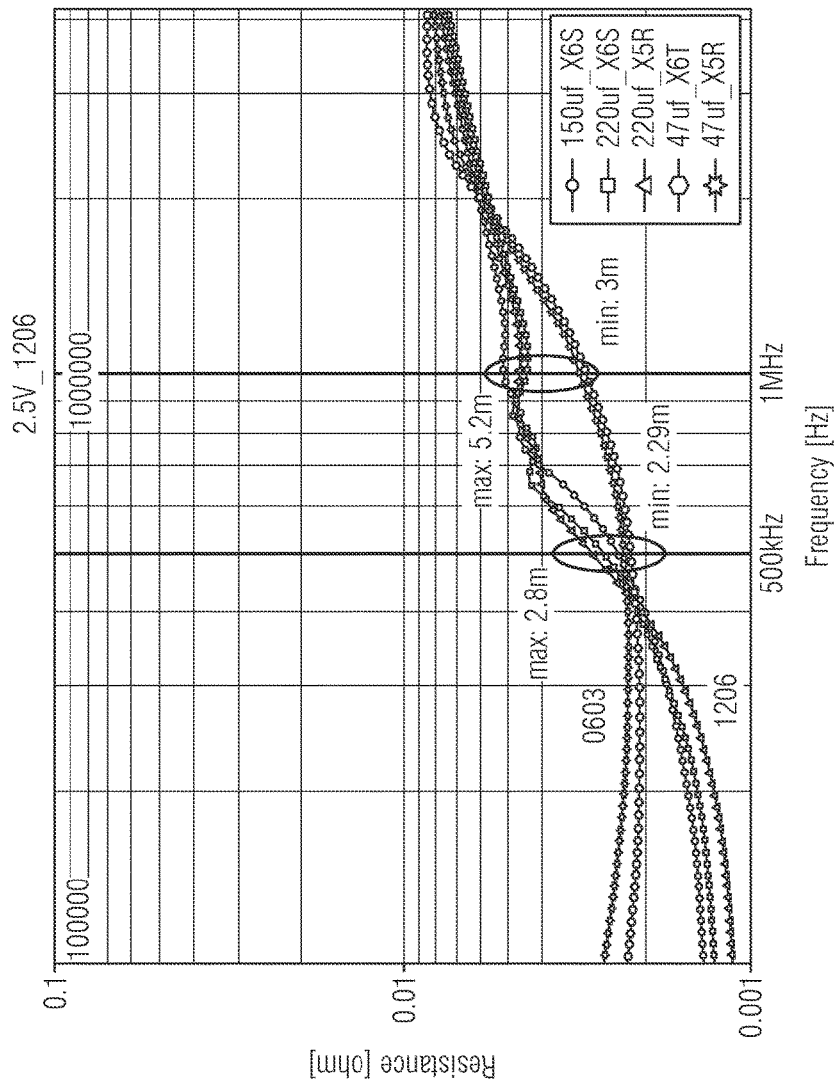
FIG. 11 illustrates a graph of resistance measured at varying frequencies for the output capacitor.

FIG. 11 illustrates a graph of resistance measured at varying frequencies for the output capacitor illustrating the ESR (Equivalent Series Resistance) as a function of frequency for different output capacitors. The lowest possible ESR is desirable for applications including a high current density and high switching frequencies, FIG. 11 illustrates comparisons at two frequencies, namely 500 KHz and 1 MHz, and illustrates that the resistance can be reduced by appropriate selection of the output capacitor.

Spatially relative terms such as "under", "below", "lower", "over", "upper" and the like are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A winding module for a hybrid transformer, comprising:
a primary winding electrically coupled in series with a secondary winding,
wherein the primary winding comprises a first conductive trace arranged on a planar support and the secondary winding comprises a second conductive trace arranged on the planar support,
wherein the first conductive trace and the second conductive trace are arranged in a stack,
wherein the planar support comprises an aperture configured to accept a magnetic core,
wherein the primary winding comprises a plurality of conductive primary layers and the secondary winding comprises a plurality of conductive secondary layers, the conductive primary layers and the conductive secondary layers being arranged on the planar support in a stack, and wherein the conductive primary layers each comprise a planar spiral with at least one turn,
wherein an outer end of a first planar spiral is vertically aligned with an outer end of a second planar spiral, the second planar spiral being adjacent the first planar spiral in the stack, and wherein an inner end of the second planar spiral is angularly offset with respect to the inner end of the first planar spiral.

2. The winding module of claim 1, wherein the conductive secondary layers are coupled in parallel by a common conductive via extending substantially perpendicularly to the planar support and the planar spirals are coupled in series by one or more conductive vias extending between adjacent ones of the planar spirals.

3. The winding module of claim 1, wherein the inner end of the second planar spiral is vertically aligned with an inner end of a third planar spiral, the third planar spiral being arranged on a side of the second planar spiral that opposes the first planar spiral.

4. The winding module of claim 3, wherein a conductive secondary layer is arranged between the first planar spiral and the second planar spiral, and wherein the outer end of the first planar spiral is electrically coupled with the outer end of the second planar spiral by a conductive via that extends through and is electrically insulated from the conductive secondary layer.

5. The winding module of claim 1, wherein the stack comprises a first substack and a third substack, the first substack and the third substack each comprising equal numbers of conductive primary layers and conductive secondary layers arranged alternately in a stacking direction, and a second substack having two conductive primary layers arranged adjacent one another in a stacking direction, and wherein the second substack is arranged between the first substack and the third substack.

6. A module for use in a DC-DC power conversion circuit, comprising:
a hybrid transformer comprising a magnetic core and a primary winding electrically coupled in series with a secondary winding;
a synchronous rectifier coupled with a node between the primary winding and the secondary winding; and
an output capacitor coupled to an output of the secondary winding,
wherein the magnetic core comprises a composite comprising a matrix and an amorphous magnetic powder, and
wherein the amorphous magnetic powder comprises (Fe100-a-b-c-x-y-z-tNiaSnbCrcPxCyBzSit)100-αMα, wherein 0 at % ≤a ≤10 at %, 0 at % ≤b ≤3 at %, 0 at % ≤c ≤6 at %, 6.8 at % ≤x ≤10.8 at %, 2.2 at % ≤y ≤9.8 at %, 0 at % ≤z ≤4.2at %, 0 at % ≤t ≤3.9 at %, wherein M is at least one metal selected from the group consisting of Ti, Al, Mn, Zr, Hf, V, Nb, Ta, Mo and W, and wherein 0.04 wt % ≤α≤0.6 wt %.

7. The module of claim 6, wherein the primary winding has a number of turns N1 and the secondary winding has a number of turns N2, and wherein the number of turns N1 and the number of turns N2 are selected to provide a step-down conversion ratio of at least 12:1.

8. The module of claim 6, wherein M is Ti, Al and Mn, and wherein Al is more than 0 wt % and less than 0.05wt %.

9. The module of claim 6, wherein the primary winding comprises a first conductive trace arranged on a planar support and the secondary winding comprises a second conductive trace arranged on the planar support, wherein the first conductive trace and the second conductive trace are arranged in a stack, wherein the planar support comprises an aperture, wherein the magnetic core comprises a central protruding portion and two outer arms, and wherein the central protruding portion protrudes into the aperture and the two outer arms extend adjacent two opposing side faces of the planar support.

10. The module of claim 6, further comprising at least two hybrid transformer stages coupled in parallel, each hybrid transformer stage comprising:
a primary winding electrically coupled in series with a secondary winding;
a synchronous rectifier coupled to a node between the primary winding and the secondary winding; and
an output capacitor coupled to an output of the secondary winding.

11. A DC-DC power conversion circuit with a step-down conversion ratio of at least 12:1, the DC-DC power conversion circuit comprising:
a half-bridge circuit arrangement;
a resonant capacitor; and
a module comprising:
a hybrid transformer comprising a magnetic core and a primary winding electrically coupled in series with a secondary winding;
a synchronous rectifier coupled with a node between the primary winding and the secondary winding;
an output capacitor coupled to an output of the secondary winding; and
driver circuitry coupled to the half-bridge circuit arrangement and to the synchronous rectifier,
wherein the resonant capacitor is coupled between the half-bridge circuit arrangement and an input of the primary winding of the hybrid transformer,
wherein the output capacitor is coupled across a point of load, and
wherein the half bridge circuit arrangement comprises a first switch and a second switch and the driver circuitry is configured to keep the first switch ON and the second switch and the synchronous rectifier switch OFF during a TON time interval, and to keep the first switch OFF and the second switch and the synchronous rectifier switch ON during a TOFF time interval, and wherein the TON time interval and the TOFF time interval are complementary time intervals within one switch operating cycle,
wherein the DC-to-DC conversion circuit is configured to provide power from a DC voltage source connected between an input terminal and a common terminal to a DC load connected between an output terminal and the common terminal, and wherein:
the first switch comprises one end connected to an input terminal;
the second switch comprises one end connected to another end of the first switch and another end connected to an output terminal;
the synchronous rectifier comprises an end connected to the common terminal;
the resonant capacitor has one end connected to the another end of the first switch;
a resonant inductor has one end connected to another end of the resonant capacitor;
the first winding of a hybrid transformer has a first end connected to another end of the resonant inductor and a second end connected to another end of the synchronous rectifier;
the second winding of the hybrid transformer has a first end connected to the second of the first winding, and a second end of the second winding connected to the output terminal;
the resonant inductor and the resonant capacitor form a resonant circuit during the TOFF time interval with a resonant current flowing through the first winding into the DC load;
a first turns ratio n of the hybrid transformer is a total number of turns of both the first winding N1 and the second winding N2 divided by a number of turns of the second winding N2 of the hybrid transformer;
an input current during the TON time interval stores an inductive energy in the first and the second winding and during the TOFF time interval the stored inductive energy is transferred to the DC load through the second winding by n times higher current than the input current;
a second turns ratio m of the hybrid transformer is the ratio between number of turns of the first winding N1 and the number of turns of the second winding N2 of the hybrid transformer;

the resonant current in the first winding is amplified by the second turns ratio m of the hybrid transformer and sent to the DC load through the second winding of the hybrid transformer;
a duty ratio D is ratio between the TON time interval and the switching operating cycle TS; and
a DC-to-DC voltage step-down conversion ratio of the converter depends on the duty ratio D and the first turns ratio n of the hybrid transformer.

* * * * *

UNITED STATES PATENT AND TRADEMARK OFFICE
CERTIFICATE OF CORRECTION

PATENT NO. : 10,403,428 B2  
APPLICATION NO. : 16/024520  
DATED : September 3, 2019  
INVENTOR(S) : Rainer et al.

Page 1 of 1

It is certified that error appears in the above-identified patent and that said Letters Patent is hereby corrected as shown below:

In the Claims

Column 19, Line 30 (Claim 6) please change "4.2at" to -- 4.2 at --  
Column 19, Line 41 (Claim 8) please change "0.05wt" to -- 0.05 wt --

Signed and Sealed this  
Fifteenth Day of October, 2019

Andrei Iancu  
*Director of the United States Patent and Trademark Office*